ns Patent [19] [11] 4,364,609
[45] Dec. 21, 1982

[54] EMPTY/LOAD BRAKE CONTROL VALVE APPARATUS

[75] Inventor: David J. Wickham, London, England

[73] Assignee: Westinghouse Brake & Signal Co., England

[21] Appl. No.: 928,578

[22] Filed: Jul. 27, 1978

Related U.S. Application Data

[63] Continuation of Ser. No. 772,255, Feb. 25, 1977, abandoned, which is a continuation of Ser. No. 638,668, Dec. 8, 1975, abandoned.

[30] Foreign Application Priority Data

Feb. 8, 1975 [GB] United Kingdom ............... 05450/75

[51] Int. Cl.³ .............................................. B60T 8/18
[52] U.S. Cl. .................................. 303/23 R; 188/195
[58] Field of Search .......................... 303/22 R, 23 R; 188/195

[56] References Cited

U.S. PATENT DOCUMENTS

| 2,039,710 | 5/1936 | Dean | 303/23 R |
| 2,088,185 | 7/1937 | Borde | 303/23 R |
| 3,193,333 | 7/1965 | Weber | 303/23 R |
| 3,291,265 | 12/1966 | Larsson | 303/23 R |
| 3,425,752 | 2/1969 | Pollinger et al. | 303/23 R |
| 3,671,086 | 6/1972 | Scott | 303/23 R |
| 3,883,188 | 5/1975 | Wickham | 303/23 R |

Primary Examiner—Edward R. Kazenske
Attorney, Agent, or Firm—Larson and Taylor

[57] ABSTRACT

Empty/load control valve apparatus is proposed for use with direct release triple valves which operate by switching in an extra volume with the brake cylinder for empty loaded conditions. This improvement provides a valve operated in response to leakage away of brake cylinder pressure to enable dissipation also of the extra volume pressure to prevent brake cylinder isolation resulting from the extra volume pressure.

2 Claims, 1 Drawing Figure

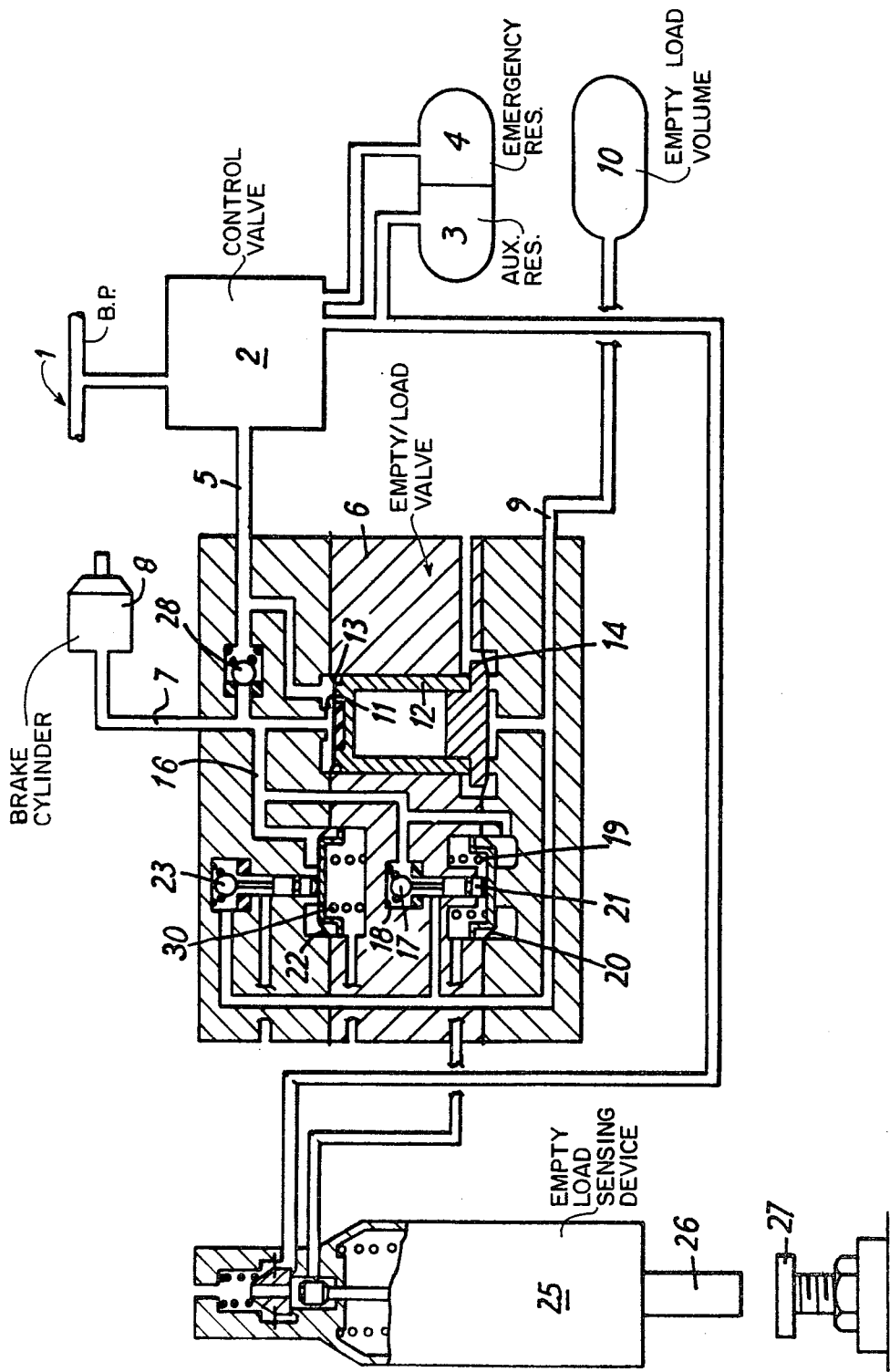

EMPTY/LOAD BRAKE CONTROL VALVE APPARATUS

This application is a continuation of application Ser. No. 772,255, filed Feb. 25, 1977 and now abandoned, which is a continuation of application Ser. No. 638,668, filed Dec. 8, 1975 and now abandoned.

This invention relates to empty/load control valve apparatus for braking systems and relates especially but not exclusively to such apparatus for use in conjunction with a control valve for adjusting a brake pressure corresponding to a given change of brake pipe pressure from a release pressure in accordance with vehicle loading.

In U.S. Pat. No. 3,883,188 there is described and claimed an empty/load fluid pressure control valve apparatus including a brake pressure input port, a brake cylinder pressure output port and a port for connection to an extra volume, cut-off valve means connected between the brake pressure input port and the brake cylinder output port and operable by a differential pressure responsive means responsive in operation to the pressure of the extra volume port predominating over the brake pressure at the input port to close the cut-off valve, a further valve which is controlled by presence or absence of fluid pressure applied from an empty-load sensing device and which holds closed a communication which otherwise is provided between the brake cylinder output port and the extra volume port for a loaded condition.

According to the present invention there is provided an improvement in or modification of the above and including means for, during a brake application, venting fluid pressure from said extra volume in the event of the brake cylinder pressure falling to less than a prescribed value.

By providing such means the said cut-off valve may re-open to maintain brake cylinder pressure from the input port.

In order that the invention may be more clearly understood and readily carried into effect, the same will be further described by way of example, with reference to the accompanying drawing which illustrates in schematic form, a brake system utilising an empty-load control valve apparatus in accordance with the invention.

Referring to the drawing, the braking apparatus which is shown is controlled by the pressure in a brake pipe 1, which is connected to a control valve denoted by the block reference 2 which has an associated auxiliary reservoir 3 and an emergency reservoir 4. The output pressure from the control valve is applied to a brake pressure input port 5 of an empty-load fluid pressure control valve having a main body 6. The empty-load control valve governs in dependence upon vehicle loading, the pressure which appears at a brake cylinder output port 7 and which is applied to a brake cylinder 8. The empty-load control valve has an extra volume port 9 which is connected to an extra volume 10 which, as will be seen hereafter, shares the brake cylinder air under empty conditions. A check valve 28 is provided between the above mentioned ports 5 and 7 which, as will be seen, allows fluid flow between 7 and 5 on release of the brake.

The empty-load valve includes a cut-off valve 11 which is controlled by the differential pressures across a plunger 12 between a pair of diaphragms 13 and 14. The cut-off valve 11 is included in a path between the brake pressure input port 5 and the brake cylinder output port 7. A passage 16 is provided between the brake cylinder output port 7 and the underside of the diaphragm 14 via a further valve 17 which is biassed to a normally closed condition by bias springs 18 and 19. The valve 17 is a diaphragm operated valve and is deflectable against the spring bias afforded by springs 18 and 19 by a sufficient pressure being present in the path 16 acting upon the diaphragm 20. The upper side of the diaphragm 20 remote from 16 is connected via an empty-load sensing device 25 to the auxiliary reservoir 3. The valve 17 is operated by a sealingly slidable stem 21 above the diaphragm piston 20. A further such arrangement having a diaphragm 22 is provided also in the body of the device, to operate a further valve 23, which is shown unseated in the drawing such as to provide a vent passage between the extra volume 10 and atmosphere, diaphragm 22 being controlled by pressure in 16.

The empty-load sensing device 25 is mounted on a sprung part of the vehicle and has a plunger 26 and an associated adjustable abutment 27 mounted on an unsprung part of the vehicle. The parts 26 and 27 abut in a loaded condition of the vehicle and the mechanism of 25 is such that in the unloaded condition the communication between the upper side of the diaphragm 20 is disconnected from the auxiliary reservoir and connected to atmosphere. The details of the empty-load sensing device form no part of the present invention.

Before referring to the manner of operation of the empty-load control valve apparatus, a brief description of the control valve of block 2 will be given. This consists essentially of a service control portion which is basically a triple valve controlled by a reduction of brake pipe pressure in relation to auxiliary reservoir, to relay auxiliary reservoir pressure to the brake cylinder. When a sufficient amount of auxiliary reservoir air has been relayed to the brake cylinder, the triple valve laps into a stable lap condition and the brake pressure is thus determined by the drop of brake pipe pressure. The control valve of the block 2 is also assumed to include an emergency portion which, if the brake pipe pressure is allowed to be reduced at more than a certain rate, an additional amount of air is discharged from the emergency reservoir 4 into the brake cylinder to achieve an emergency braking application. Apparatus of the general type of block 2 is described in British Patent Specification No. 1302930 or 1306708.

In operation of the empty-load control valve apparatus, assuming that the vehicle carrying the apparatus is sufficiently loaded to abut the abutment 27 and connect the upper-side or top of the piston 20 to the auxiliary reservoir 3, the bias, which is inherent in the biassed further valve 17 by virtue of the springs 18 and 19, is supplemented by the auxiliary reservoir pressure. A brake application made by the control valve apparatus 2 produces a brake pressure at the brake input port 5 and this is applied above the diaphragm 13 of the valve 11. The plunger 12 of this valve is thus deflected downwards to its lowermost position allowing pressure in the port 5 to flow past the seat of the valve 11 into the passage 16 and also via the brake cylinder output port 7 to the brake cylinder 8. Owing to the auxiliary reservoir pressure above the diaphragm 20, the valve 17 remains seated and no air flows beyond the passage 16 through 17. Pressure below the diaphragm 20 can never exceed the pressure above. When in certain circumstances both pressures are equal, the springs 18 and 19 ensure that the valve 17 remains closed. For a full service application, auxiliary reservoir and brake cylinder pressure equalise in a conventional manner. A release of the brake cylinder pressure is effected also in a conventional manner by an increase of brake pipe pressure causing the triple valve of the apparatus of block 2 to move to a release position and the brake cylinder is vented through the brake cylinder exhaust valve of the triple valve apparatus via the ports 7 and 5 of the empty-load control valve.

In an emergency application, the empty-load control valve operates in a similar manner to that described above, the brake cylinder pressure rising to a higher value being an equalisation pressure with the auxiliary reservoir 3, together with the emergency reservoir 4.

Referring now to operation of the apparatus in the empty-condition, the load sensing device 25 is raised holding the plunger 26 clear of the abutment 27 and the auxiliary reservoir 3 is isolated from the upper side of the diaphragm 20, the upper side of 20 now being connected to atmosphere via the load sensing device. A brake pressure appearing at the brake pressure input port 5 downwardly deflects the plunger 12 and air flows past the valve 11 into the passage 16 and to the brake cylinder via the brake cylinder port 7. The pressure in passage 16 is again applied below the diaphragm 20 but the valve 17 remains closed due to the bias of the springs 18 and 19. The initial rise in brake cylinder pressure up to a pressure of, say, 91 lbs. per square inch is therefore at the same rate as in the loaded condition of the apparatus. At the said value, the bias afforded by the spring 30 associated with valve 23 is overcome by the pressure on diaphragm 22 and valve 23 is closed. At this point the extra volume 10 is therefore isolated from atmosphere. At a slightly higher brake cylinder pressure, the spring bias afforded by 18 and 19 is overcome by the pressure under the diaphragm 20, and with valve 23 closed and valve 17 now opened a flow of air now passes to the underside of the diaphragm 14. It is observed that this air can also pass via the extra volume port 9 to the extra volume 10. The brake cylinder pressure therefore remains at a value no more than that set by the bias spring 18 for a short interval during the charging of the extra volume 10 to the same pressure. Further pressure developed in the control valve 2 charges both the brake cylinder 8 and the extra volume 10. In the ultimate case of a full application, this continues until the auxiliary reservoir pressure has fallen to a load equalisation value and at this point the pressure in the brake cylinder and the extra volume which, due to the extra volume, is now substantially less than the normal equalisation pressure, is acting on the underside of the diaphragm 14. The diaphragm 14 is of larger area than the diaphragm 13 and therefore sufficient upward force is exerted on the body 12 to close off the cut-off valve 11. The pressure in the brake pressure input port is thus held at a value corresponding to normal equalisation pressure under loaded conditions.

During an emergency application, the same sequence of events takes place on application with the exception that the pressures involved are proportionately higher due to the additional air which is provided by the emergency reservoir 4.

In moving to a release condition, when the pressure in the brake pipe 1 is restored, to effect a release, the pressure at the brake pressure input port 5 is vented via the valve 2 and the pressure which exists under the diaphragm 14 continues to maintain the valve 11 closed. However, after the pressure at 5 has fallen below brake cylinder pressure, pressure in the brake cylinder is vented via check valve 28 to the brake pressure input port 5 and the control valve 2. At a certain pressure in the passage 16, the springs 18 and 19 overcome the pressure above the further valve 17 and the valve 17 is closed followed by opening of valve 23 and venting of the volume 10. After a brief interval the pressure under the diaphragm 14 has vented via the valve 23 sufficiently to be overcome by the remaining pressure above the diaphragm 13. At this point the plunger 12 moves down to its lowermost position and the brake cylinder 8 continues to be vented via the port 7, the valve 11, the port 5 and the control valve 2.

In the empty loaded condition, since an initial rapid filling of the brake cylinder is provided up to a predetermined value by the presence of the springs 18 and 19 and a function similar to inshot is thereby provided.

In the event of a brake cylinder pressure leakage occuring during a brake application under light load conditions, if this leakage gives rise to a fall below about 10 p.s.i. the pressure above piston 22 is insufficient to hold the diaphragm down against spring 30 and it rises to lift valve 23 and vent the extra volume 10 via valve 23. This has the result that brake cylinder 8 is then no longer isolated from the input port 5 by virtue of the cut-off valve and can be maintained charged in accordance with the condition of the brake pipe controlling the triple valve 2.

Having thus described our invention what we claim is:

1. An empty/load fluid pressure control valve apparatus for controlling the brake cylinder pressure of a load carrying vehicle comprising: a control valve housing having a brake pressure input port, a brake pressure output port and a first communicating passage connecting the output port with the input port; means defining an extra volume; a first differential pressure means responsive to differences in pressure between said extra volume and the input port; a cut-off valve means, operable by said differential pressure means, for closing the communicating passage connecting the output port with the input port; a load sensing device for selectively producing at the output thereof a low pressure signal when the vehicle is empty and higher pressure signal when the vehicle is loaded; a second communicating passage connecting the output port and the extra volume; a second differential pressure means responsive to differences in pressure between the output of said load sensing device and the output port; a first resilient bias means acting on the second differential pressure means in the same sense as the output of the load sensing device so as to establish a first predetermined operating value in an empty condition and a second, higher, predetermined operating value in a loaded condition; a second valve in the second communicating passage operable by said second differential pressure means in a sense such that the second valve is closed in response to an output port pressure less than said first predetermined value for an empty condition and an output port pressure less than said higher second predetermined value for a loaded condition; a vent leading to atmosphere and connected to the extra volume; a third valve in the vent and operable independently of the load sensing device; a second resilient bias means urging the third valve open; and a third pressure responsive means connected to operate said third valve to a closed position in response to pressure at the output port in excess of a third predetermined value determined by the resilient bias means such that, in operation, a decrease in pressure at the output port below the third predetermined value, irrespective of the output of the load sensing means, causes the third valve to open thereby venting pressure in the extra volume so that the cut-off valve means re-opens the first communicating passage to recharge the output port pressure.

2. An empty/load fluid pressure control valve apparatus as claimed in claim 1 wherein the first and second resilient bias means are arranged such that with increasing brake cylinder pressure, the third valve closes before the second valve opens.

* * * * *